(12) United States Patent
Trichard et al.

(10) Patent No.: US 7,156,584 B2
(45) Date of Patent: Jan. 2, 2007

(54) METHOD FOR INSTALLING A HIGH OR MEDIUM POWER CABLE IN THE GROUND

(75) Inventors: Claude Trichard, Saint-Andre Farivillers (FR); Gérard Plumettaz, Bex (CH); Joël Perelle, Montpellier (FR); Giovanni Pozzati, Olgiate Oloua (IT); Bernard Censier, Sens (FR)

(73) Assignees: Entreprise Hydraulique Et Travaux Publics—E.H.T.P., Saint Etienne du Gres (FR); Plummettaz, Zi En Vannel C (CH)

( * ) Notice: Subject to any disclaimer, the term of this patent is extended or adjusted under 35 U.S.C. 154(b) by 0 days.

(21) Appl. No.: 10/499,328

(22) PCT Filed: Dec. 16, 2002

(86) PCT No.: PCT/FR02/04373

§ 371 (c)(1),
(2), (4) Date: Oct. 21, 2004

(87) PCT Pub. No.: WO03/052894

PCT Pub. Date: Jun. 26, 2003

(65) Prior Publication Data

US 2005/0036843 A1 Feb. 17, 2005

(30) Foreign Application Priority Data

Dec. 17, 2001 (FR) .................................. 01 16327

(51) Int. Cl.
*H02G 1/08* (2006.01)
(52) U.S. Cl. ............. 405/183.5; 405/184; 254/134.3 R
(58) Field of Classification Search ............. 405/183.5, 405/184.1–4, 158, 159, 174, 177; 254/134.4, 254/134.4 FT, 134.3 R, 134.3 SC; 138/98, 138/99

See application file for complete search history.

(56) References Cited

U.S. PATENT DOCUMENTS

| 3,546,890 | A | * | 12/1970 | Ede ............................. 405/157 |
| 4,048,807 | A | | 9/1977 | Ellers et al. |
| 4,185,809 | A | * | 1/1980 | Jonnes ..................... 254/134.4 |
| 4,232,981 | A | | 11/1980 | Lee |
| 4,437,789 | A | * | 3/1984 | Kasiewicz .................. 405/156 |
| 4,629,363 | A | * | 12/1986 | Rose et al. ................. 405/155 |
| 4,941,774 | A | | 7/1990 | Harmstorf |
| 5,184,919 | A | * | 2/1993 | Smet ........................ 405/184.3 |
| 5,433,277 | A | | 7/1995 | Davison |
| 5,558,465 | A | * | 9/1996 | Pecot et al. .................. 405/178 |

(Continued)

FOREIGN PATENT DOCUMENTS

DE        4115907     * 11/1992    .................. 405/174

(Continued)

*Primary Examiner*—Frederick L. Lagman
(74) *Attorney, Agent, or Firm*—Oliff & Berridge PLC (57) ABSTRACT

The invention concerns a method for setting medium or high power electric cables (2) in the ground, which consists in digging a trench (14) evacuating the materials derived from the trench (14) towards a treatment device, for example by crushing, depositing at least a duct or an assembly of three installation ducts in the trench (14), backfilling the trench (14) with the treated materials and setting in said installation duct (1), at least a medium or high power electric cable (2) by pushing it while injecting water (6a) under pressure into the installation duct (1) so as to use the water (6a) as carrier and discharge fluid for the heat energy resulting from friction between the cable (2) and the installation duct (1).

16 Claims, 6 Drawing Sheets

U.S. PATENT DOCUMENTS 5,762,321 A * 6/1998 Petersen et al. ......... 254/134.4
5,897,103 A * 4/1999 Griffioen et al. ......... 254/134.4
5,967,495 A   10/1999 Kaminski et al.
6,402,123 B1 * 6/2002 Rivard ................... 254/134.4
6,540,208 B1 * 4/2003 Pecot et al. ............. 254/134.4
6,793,202 B1 * 9/2004 Pecot et al. ............. 254/134.4
6,848,541 B1 * 2/2005 Griffioen et al. ........... 184/15.2

FOREIGN PATENT DOCUMENTS

GB    2 190 457 A    11/1987

* cited by examiner

METHOD FOR INSTALLING A HIGH OR MEDIUM POWER CABLE IN THE GROUND

The present invention relates to the technical field of installing cables, for example fiber-optic cables or the like, into buried and/or submerged installation ducts. The term "cables" should also be understood to mean tubes or the like for transporting energy, fluids and electrical, light or other signals. The term "cable" also relates to single-phase or three-phase low-, medium- and high-power electrical cables supporting an electrical voltage of, for example, greater than or equal to 1000 volts and having a relatively high weight per unit length, for example around 8 to 35 kg/m.

Various methods for installing cables, apart from high- or medium-power electrical cables, inside ducts are known. These methods are defined below.

The term "pulling" is understood to mean that the cable is attached via its end to a sling already installed in the duct. This sling is fastened to the drum of a winch that winds up the sling and allows the cable to be installed in the duct, by said cable sliding along the inside of said duct.

The term "pushing-pulling" is understood to mean that a cable is simultaneously pulled and pushed by using means for pushing the cable at its entry into the duct, thereby reducing the tensile forces on the front of the cable and increasing the installation distance. Means for driving the cable may also be provided around mid-path.

The term "blowing" is understood to mean that the installation duct is pressurized, by means of a fluid, between the cable feed means and a sealed "pig" attached to the front of the cable. The pressure within the duct thus moves the pig along, which pulls on the front of the cable. The pressurization is generally accomplished with air.

The term "pushing-blowing" is understood to mean that means are used for pushing the cable and its entry into the duct, these means being combined with means for implementing the "blowing" method. Here again, an increase in the cable installation distance is obtained.

The term "pushing-floating" and/or "pushing-carrying" should be understood to mean a technique in which a fluid—gas or liquid—is injected into the duct, and it is the friction of the fluid on the external sheath of the cable that exerts the tensile force. In this installation technique, the static pressure of the air or fluid inside the duct has the effect of pushing the cable back out of the duct, which dictates the use of means for firstly compensating for this force and secondly pushing said cable upon introducing it into the installation duct.

Of course, the fluid used for the "carrying" is air, available in large quantity on a site, or water.

In the rest of the text, the term "relative density" denotes the ratio of the density of the cable to the density of water. The same applies when we speak of the relative density of a carrying liquid or carrier liquid. By definition, the density of water is equal to 1.

Thus, in particular in the telecommunications field in which fiber-optic cables are installed, a "pushing-carrying" method is known in which fiber-optic cables are installed in installation ducts preinstalled in the ground. This technology cannot be easily transposed to electrical cables whose characteristics in terms of weight per idea of length and relative density result in relatively high levels of friction and consequently lead to substantially shorter installation distances.

The present invention relates more specifically to the installation of electrical cables that support electrical voltages of greater than 1000 volts and able to convey single-phase or three-phase, medium or high electrical power. Such cables, known as such, have single-phase elements surrounded by an HDPE sheath and have a weight per unit length of greater than 0.5 kg/m.

The electrical cables may also be grouped together in threes when the power is transported in three phases.

Owing to their high weight per unit length, these cables or cable assemblies are not placed in installation ducts over long distances, as is the case for example with fiber-optic cables.

In fact, the introduction of such (medium- and high-power) electrical cables would generate large frictional forces with the installation duct. These high friction forces would result in a substantial reduction in the installation distance, with thrust, and as the case may be pulling, forces involved that are unacceptable.

These excessively high forces involved when installing a cable may result in damage to the protective sheath of the cable and to the installation duct itself.

In the case of substantial friction between two materials, of the HDPE or PVC type, or between HDPE and PVC, heating may be observed that results in softening or melting of said materials.

Indeed, the use of electrical cables having an outer sheath made of HDPE or PVC that have to be installed in a duct also made of HDPE or PVC would result in friction liable to irreversibly damage the sheath of said electrical cable.

Electrical cables are in general buried directly in the ground using a burying method that consists in opening a trench, laying the cables in the trench and back-filling the trench.

Such civil engineering operations, and in particular the back-filling using, for example, the materials removed when opening the trench, may result in the outer sheaths of the electrical cables being damaged. The main consequences of this are defects in the electrical insulation or degradation initiators. In such a situation, it is essential to provide the electrical cables with a reinforced outer sheath or one designed to constitute a mechanical and/or electrical protection layer.

The introduction of medium- or high-power electrical cables into installation ducts also assumes in particular that suitable pushing means, capable of developing a sufficient thrust force, are available. The known pushing means generally comprise pushing members that grip the cable so as to push it into the installation duct. The use of a high thrust force assumes that there is good purchase by the pushing members on the cable, and in particular on its outer sheath. Good purchase is possible under these conditions only with projecting teeth or protuberances that engage in the constituent material of the sheath. The latter must have impressions small enough in size not to degrade the performance of the cable, something which is difficult to guarantee with high thrust forces.

Conversely, the use of pushing members having a smooth surface in contact with the cable would result, owing to the high thrust force to be provided, in slippage, and consequently to heating of the sheath, resulting firstly in a reduction in the rate of advance or rate of installation of the cable in the duct and then in destruction of the sheath by the latter melting and tearing.

One objective of the present invention is to overcome the drawbacks of the burying techniques or the limitations associated with the known techniques for installing electrical cables in an installation duct.

Another objective of the invention is to appreciably reduce the costs of installing such electrical cables.

The objectives assigned to the present invention are achieved by means of a method for laying electrical cables in the ground and of an apparatus for implementing said method.

According to the invention, the method consists in installing at least one high- or medium-power electrical cable in an existing installation duct or a duct placed beforehand in the ground, on the one hand, by pushing the cable and, on the other hand, by injecting pressurized water into the installation duct so as to use the water as fluid for extracting the thermal energy resulting from the friction forces between said cable and the installation duct.

According to the invention, the method for laying electrical cables in the ground consists in digging a trench, in removing the materials coming from the trench to a treatment device, for example a crusher, in depositing at least one installation duct in the trench, in back-filling the trench with the treated materials and in installing, in said installation duct, at least one medium- or high-power electrical cable, on the one hand, by pushing it and, on the other hand, by injecting pressurized water into the installation duct so as to use the water as fluid for for extracting the thermal energy resulting from the friction between the cable and the installation duct.

According to the invention, the pushing means comprise at least one pushing unit that has two superposed chains rotating in opposite directions and gripping the electrical cable so as to push it into the installation duct.

In one mode of implementation, the method according to the invention consists in checking the temperature of the fluid.

In one mode of implementation, the method according to the invention consists in controlling means for cooling the carrying fluid in response to the result of the check made of the temperature of said fluid.

In one mode of implementation, the method according to the invention consists in controlling the rate of advance of the electrical cable into the installation duct according to the temperature of the fluid.

In one mode of implementation, the method according to the invention consists in checking the temperature of the fluid at the inlet and at the outlet of the installation duct so as consequently to control means for cooling the fluid or to modulate the rate of advance of the electrical cable into the installation duct.

In one mode of implementation, the method according to the invention dependent on the amount of energy to be removed, if this is small, the temperature of the water varies little since the amount of water used to carry out the operation is such and such is its calorific value that a manual test, such as dipping one's hand into the water, is sufficient to be assured of the suitable temperature level of the water, which is an enormous advantage when implementing the method on sites.

In one mode of implementation, the method according to the invention consists in using an electrical cable whose relative density is between 1 and 3.

In one embodiment of the apparatus according to the invention, each chain consists of an assembly of links, the external profile of which has ribs approximately transverse to the direction of advance of the chain, so as to have purchase on the electrical cable.

In one embodiment of the apparatus according to the invention, the ribs are made of aluminum.

In one embodiment of the apparatus, the ribs have an approximately semicylindrical profile so as to increase their surface area of contact with the electrical cable.

In one embodiment of the apparatus according to the invention, the ribs have, in the direction of advance of the chain, a profile whose cross section comprises, respectively, a sloped rear face, a flat top and a steep or vertical front face.

In one embodiment of the apparatus according to the invention, the ribs have a height of 1 to 2 mm.

In one embodiment of the apparatus according to the invention, the pushing unit is capable of driving a cable of circular cross section or an assembly of three twisted cables.

In one embodiment of the apparatus according to the invention, it comprises three pushing units spaced one behind the other in order to advance the electrical cable or the cable assembly.

In one embodiment of the apparatus according to the invention, it includes means for controlling the rate of circulation of the chains and for synchronizing it with the rate of rotation corresponding to the unwinding of the cable from the drum.

In yet another embodiment, the apparatus furthermore includes an intake member for the fluid, which has a sealing member, and the installation duct is a twisted cable, the sealing member being passed through by the cable, in order to form a partition impermeable to the fluid, and being rotated by this cable during the travel of said cable.

In yet another embodiment, the sealing member includes a seal having a window provided with at least two lobes complementary in shape to the external outline of the twisted cable.

The method of installing electrical cables according to the invention has the advantage of substantially reducing the overall cost of such an installation. This is because the electrical cable, which is laid in the ground, is mechanically and electrically protected by the installation duct and it is therefore unnecessary to provide a specific sheath or a reinforced sheath on the electrical cable itself.

Furthermore, it is possible with the same method as that used for installing the cable to remove the latter from the installation duct so as to install a different cable, for example one of different power. It is thus possible for one and the same user or one and the same municipal district to design the power supply without having to dig new trenches or to install additional high-power electrical cables.

Other features and advantages will also become apparent from the detailed description given below with reference to the appended drawings in which.

Figure 1:
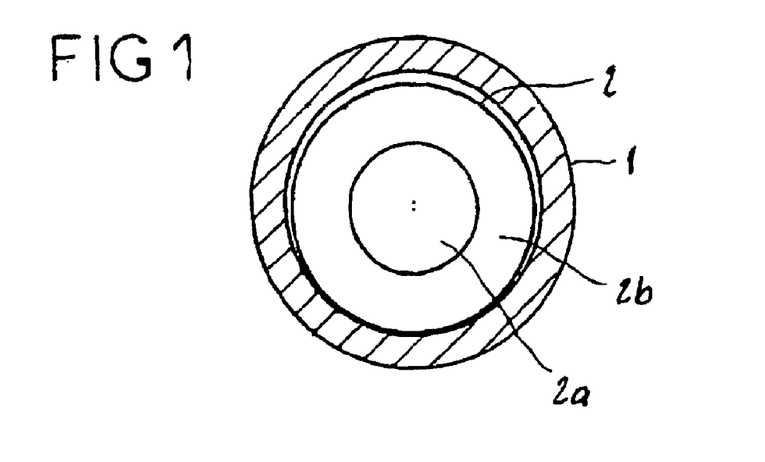
FIG. 1 is a cross section through an electrical cable installed in an installation duct, according to the invention.

FIG. 1 depicts an example of an installation duct 1 shown in cross section, in which an electrical cable 2 having, for example, a conducting core 2a and an insulating outer sheath 2b is installed. The installation duct 1 is made from a grooved or smooth tube and may, if required, be lubricated. For installing electrical power cables 2, it is necessary for the ratio of the inside diameter of the installation duct to the outside diameter of the electrical cable 2 to be between 1.2 and 1.6. Such a ratio is imposed by the thermal elongation characteristics of the cables 2 and the stresses associated with the methods of laying said cables.

Figure 2:
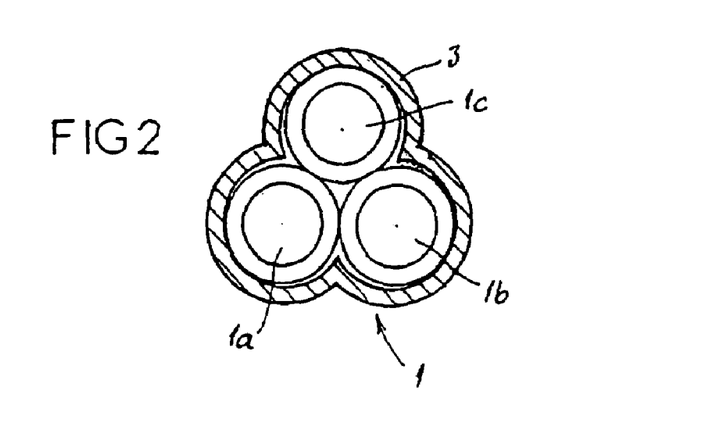
FIG. 2 is an example of an assembly consisting of three installation ducts grouped together inside a sheath, the assembly being able to be installed in a trench according to the invention.

The installation duct 1 may also consist of three tubes 1a, 1b, 1c grouped together in an external sheath 3, as shown in FIG. 2. Each of the tubes 1a, 1b, 1c may thus be provided with a single-phase cylindrical electrical cable 2. Assembling single-phase cables thus makes it possible to produce high- or medium-power three-phase electrical cables 2 that can be installed in the ground with techniques and means that are used for installing cylindrical single-phase cables.

There is therefore no additional cost as regards installation equipment. The positioning of the phases in a cloverleaf configuration is also maintained. Furthermore, single-pole (cylindrical) cables 2 can be introduced over installation distances of around 2.5 km, i.e. much longer than the installation distances obtained with a three-pole or twisted cable 2. The system for introducing the cable 2 also provides good sealing when said cable 2 has a circular cross section. Sealing is necessary when a pressurized fluid is used. The external sheath 3, which for example is thermoformed, serves to provide the assembly thus formed with mechanical cohesion.

In accordance with the invention, it is also possible to install a twisted electrical cable, which conveys a three-phase current, in the installation duct 1 shown in FIG. 1 instead of the cylindrical electrical cable 2.

By installing electrical cables 2 in an installation duct 1 it is possible to protect said cables from mechanical attack and owing to the mechanical properties of said installation duct 1, namely puncture strength, crush strength and tensile strength. Thus, it is not the electrical cable 2 that has to incorporate the protection properties, as is the case for cables that are buried directly in the ground. The electrical cables installed using the method according to the invention may thus have a smaller diameter and be wound on smaller-diameter drums. The manufacturing and transportation costs are thereby reduced by the same token.

Figure 3:
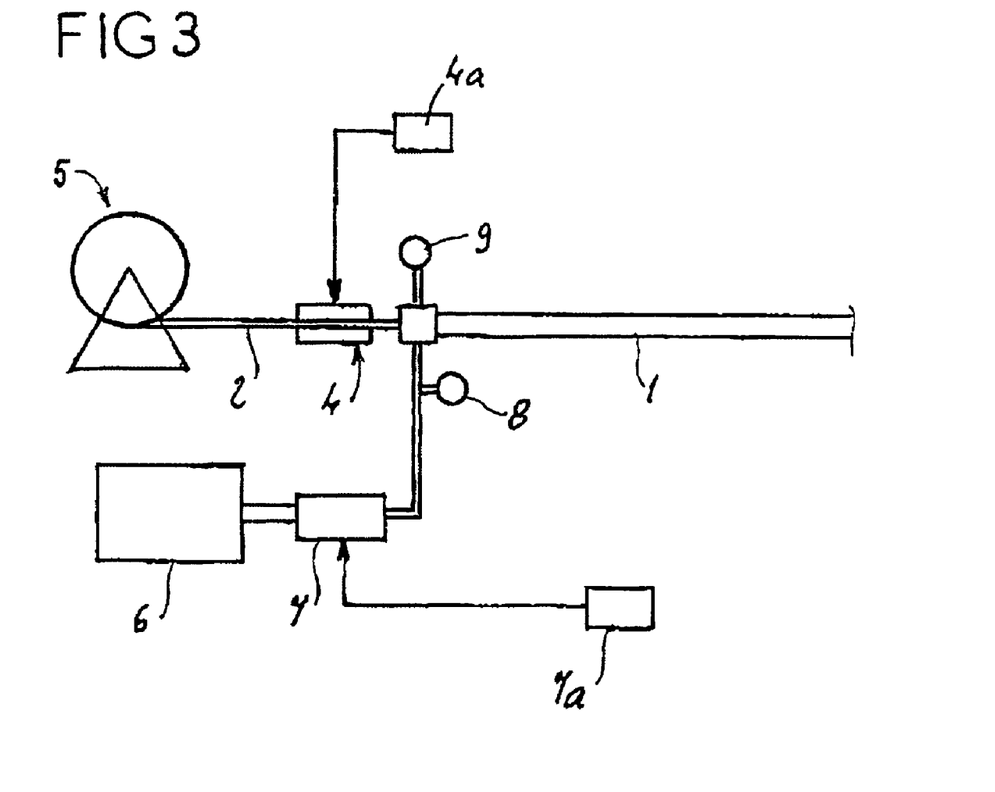
FIG. 3 is a schematic diagram of the method, showing part of the steps of the method according to the invention.

FIG. 3 is a diagram showing the principle of installing an electrical cable in an installation duct.

The apparatus for implementing the method according to the invention also includes pushing means 4 for pushing the electrical cable 2 into the installation duct 1. The pushing means are controlled by a control unit 4a, which is also used to control the rate of advance of the cable and also the thrust force applied to said electrical cable 2. The control unit 4a is used to synchronize the rate of advance of the cable 2 with the rate of rotation corresponding to the unwinding of the cable 2 from a drum 5. The apparatus according to the invention also includes a tank 6 containing a fluid, in this case water 6a. A pump 7 is used to inject the water into the installation duct 1 at between 10 and 16 bar. The flow of water in the installation duct 1, owing to its friction on the external sheath of the electrical cable 2, drives the cable 2 along the installation duct 1 over a certain distance, called the installation distance.

To give an example, with a water pressure of 13 bar and a thrust force exerted by the pushing means of about 170 daN, it is possible to install a medium-voltage power cable, having for example a weight per unit length of 1.6 kg/m, over a distance of 1700 meters at a rate of 20 meters per minute.

The pump 7 is controlled by an additional control means 7a in order to adjust the water pressure. The water flow rate and the water pressure in the installation duct 1 are measured by gages 8 and 9 respectively.

Figure 4:
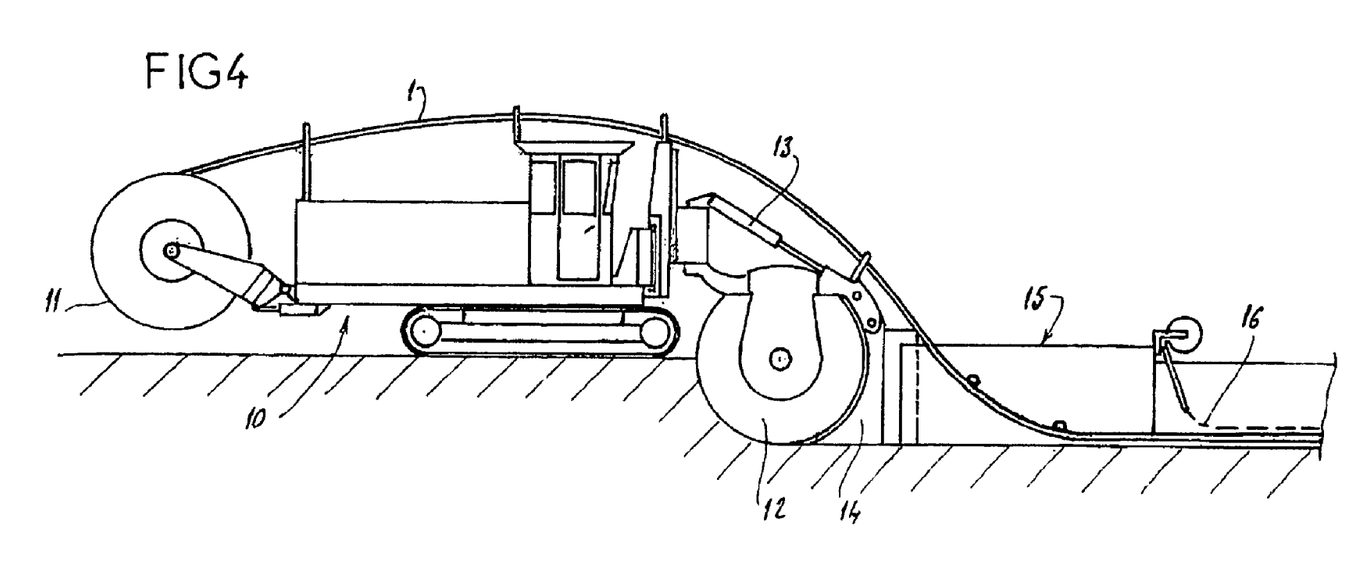
FIG. 4 shows a machine that can implement certain steps of the method according to the invention.

FIGS. 3 and 4 show schematically illustrative examples of means for implementing the steps of the method according to the invention.

When the installation duct 1 is laid by means of a machine 10 as shown in FIG. 4, the electrical cable 2 is installed in said installation duct 1 using the means shown schematically in FIG. 3.

The machine 10 for laying an installation duct 1 in the ground is preferably self-propelled and includes a roll 11 on which the installation duct 1 is stored and wound.

The machine 10 is provided with a wheel 12 that is articulated by means of a cylinder 13 to the machine 10, in order to dig a trench 14 as the machine 10 progressively moves forward.

A guiding box 15 is used to lay the installation duct 1 in the bottom of the trench 14. The installation duct 1 is advantageously covered with a warning film or netting 16, by any known device mounted on the guiding box 15, before back-filling of the trench 14. Among other indicating means, one, which is inexpensive, consists in replacing the sheath for assembling the three tubes, which is black, with a red sheath, thus avoiding having to purchase and lay a warning mesh.

Back-filling means (not shown) are also attached to the machine 10 and advance with the latter. The installation duct 1 is thus laid in the ground in a single path by the machine 10 employing all the operations used in civil engineering.

After passage of the machine 10, which in particular has means for removing the materials coming from the trench 14 and treatment means, allowing said materials to be crushed for example, before they are transferred to the rear in order to back-fill the trench 14 in which the installation duct 1 now lies. When the installation duct 1 is laid in the ground, an electrical cable 2 can then be installed therein. The drum 5 on which the electrical cable 2 is wound is used for this purpose.

Figure 5:
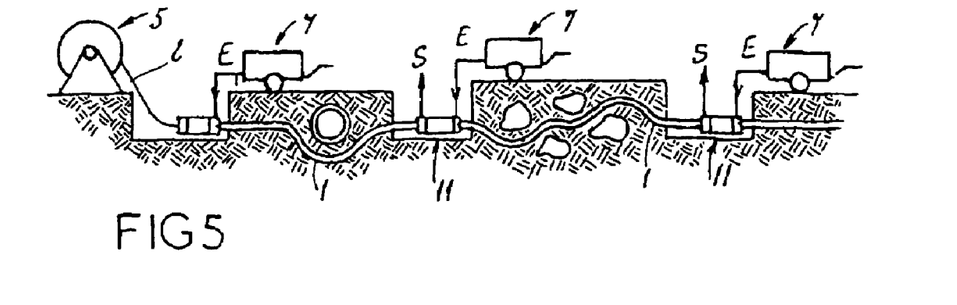
FIG. 5 is a diagrammatic representation of the implementation of the method according to the invention.

FIG. 5 shows schematically the overall installation of an electrical cable 2 inside an installation duct 1, which for example has already been laid in the ground by any known means. The pump 7 injects pressurized water 6a into the installation duct 1, as indicated by the arrow E. The water 6a constituting the fluid is expelled as indicated by the arrow S after a predetermined installation distance. Another pump 7, supplied if necessary by another tank 6, is used to inject further water as indicated by the arrow E into another section of the installation duct 1. This may possibly be repeated several times in order to obtain the largest possible installation distance for the electrical cable 2.

The water 6a is injected into the installation duct 1 via access wells 11 placed between each installation section, which may extend over a distance of about 2.5 km.

Figure 7:
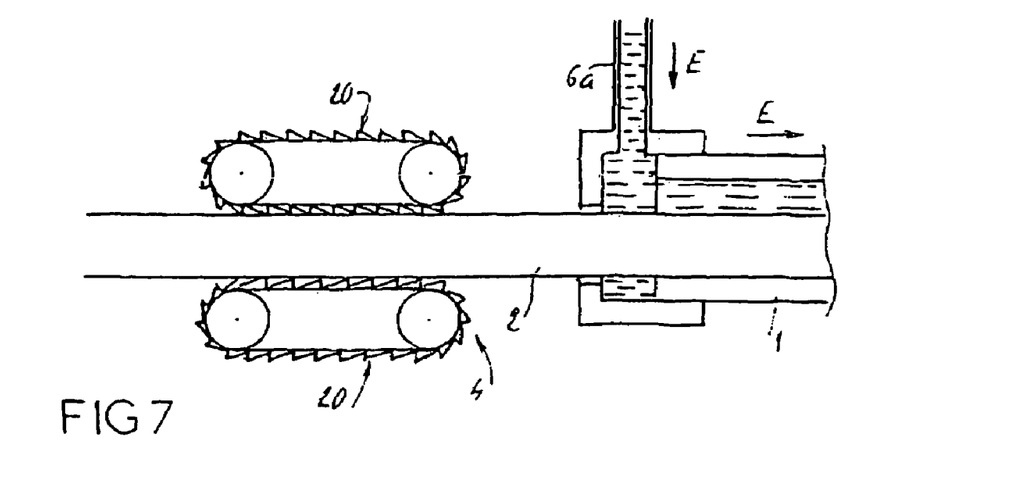
FIG. 7 is a schematic and partial representation of the pushing means of the apparatus in FIG. 6.

The apparatus for implementing the method according to the invention includes the pushing means 4, which have chains 20 as shown diagrammatically in FIG. 7. These chains 20 are placed on either side of the electrical cable 2 and exert on the latter the thrust force needed to advance it into the installation duct 1. The thrust exerted by these chains 20 on the electrical cable 2 is consequently supplemented by the action of the fluid in the installation duct 1. For the purpose of protecting the external sheath of the cable 2, the lateral pressure of the chain 20 must be as uniform as possible. This is achieved by distributing the thrust force over two or more identical pushing units, the number of these varying according to the required total force.

As an example, the pushing means 4 comprise three pushing units 4a, 4b, 4c, connected in series, through which units the electrical cable 2 passes when it is unwound from its drum 5. Each of the pushing units 4a, 4b, 4c is provided with chains 20 and with a handwheel 21 for adjusting the clamping force of said chains 20 on the electrical cable 2. By connecting, for example, the three pushing units 4a, 4b, 4c in series, exerting a prestressed clamping force that ensures predetermined radial pressure of the chains 20, using the handwheel 21, it is possible to absorb inevitable variations in the outside diameter of the cable 2 that are due to their manufacture. Thus, any slippage of the chains affecting the installation performance is avoided.

Figure 6:
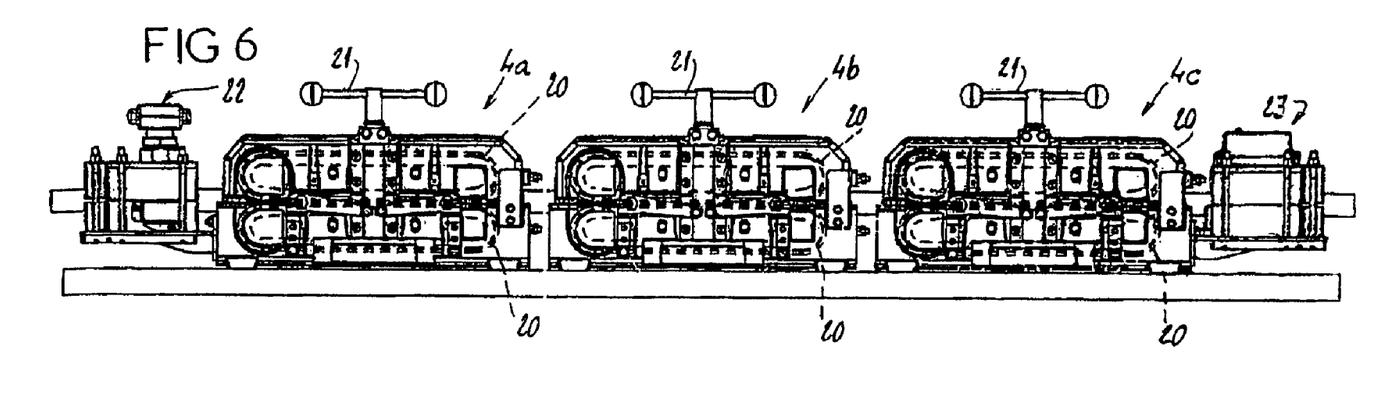
FIG. 6 shows a detail of the apparatus for implementing the method according to the invention.

A water intake member 22 is also provided at the inlet of the installation duct 1, and also a meter 23 for recording the length of cable unwound from the drum 5, as shown schematically in FIG. 6.

Figure 10:
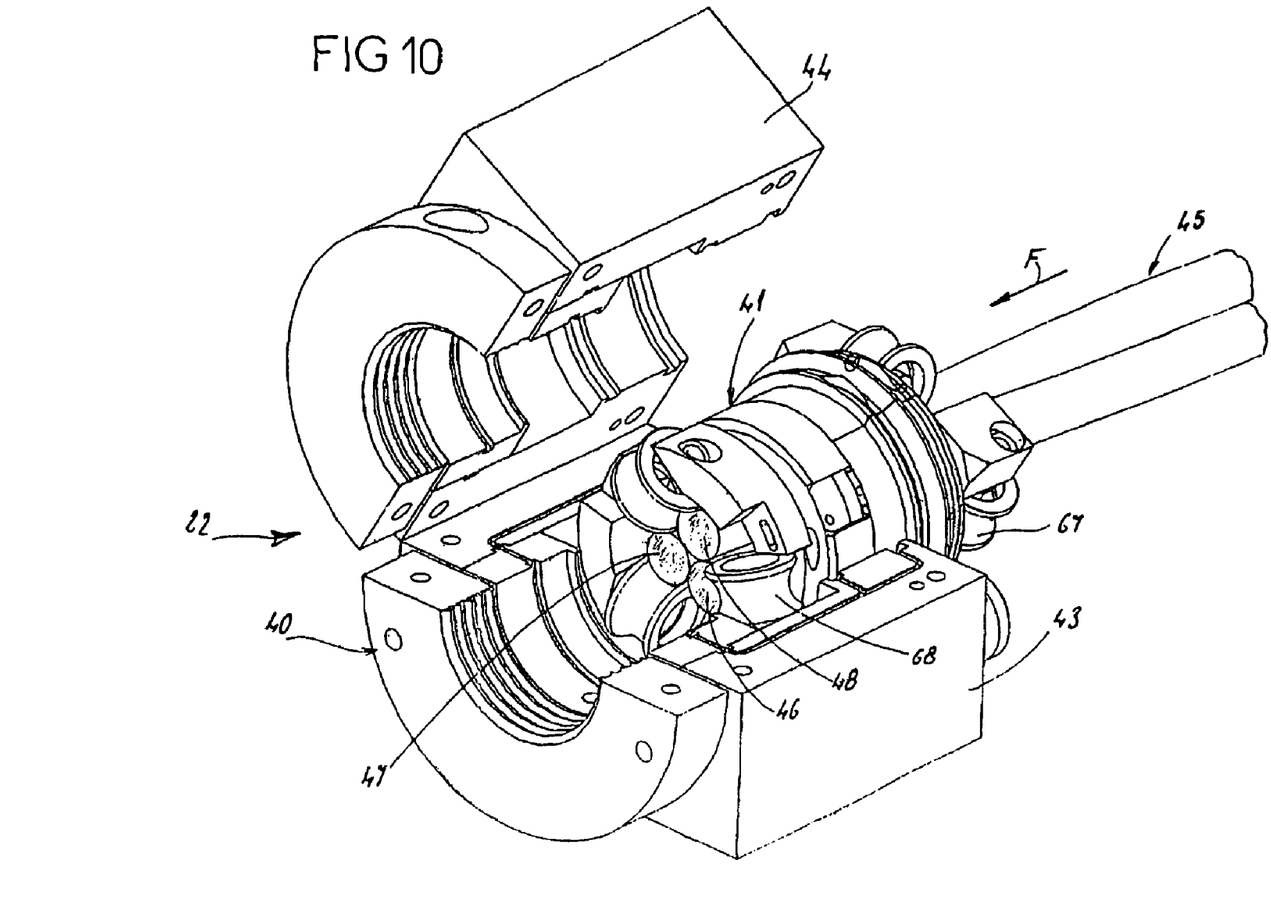
FIG. 10 is an enlarged exploded perspective view of part of a fluid intake member belonging to the apparatus shown in FIG. 6.
Figure 11:
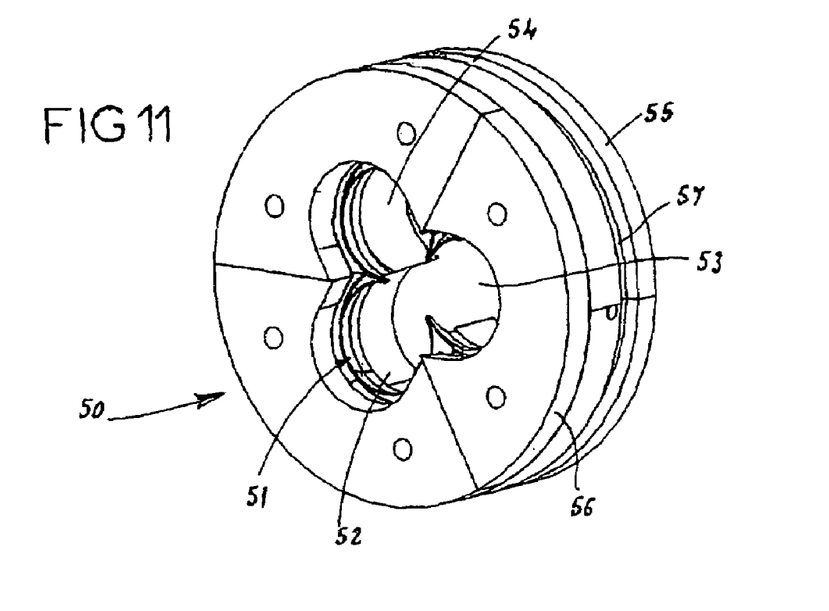
FIGS. 11 and 12 are respective and exploded perspective views, respectively, of a sealing member of the intake member in FIG. 10.
Figure 12:
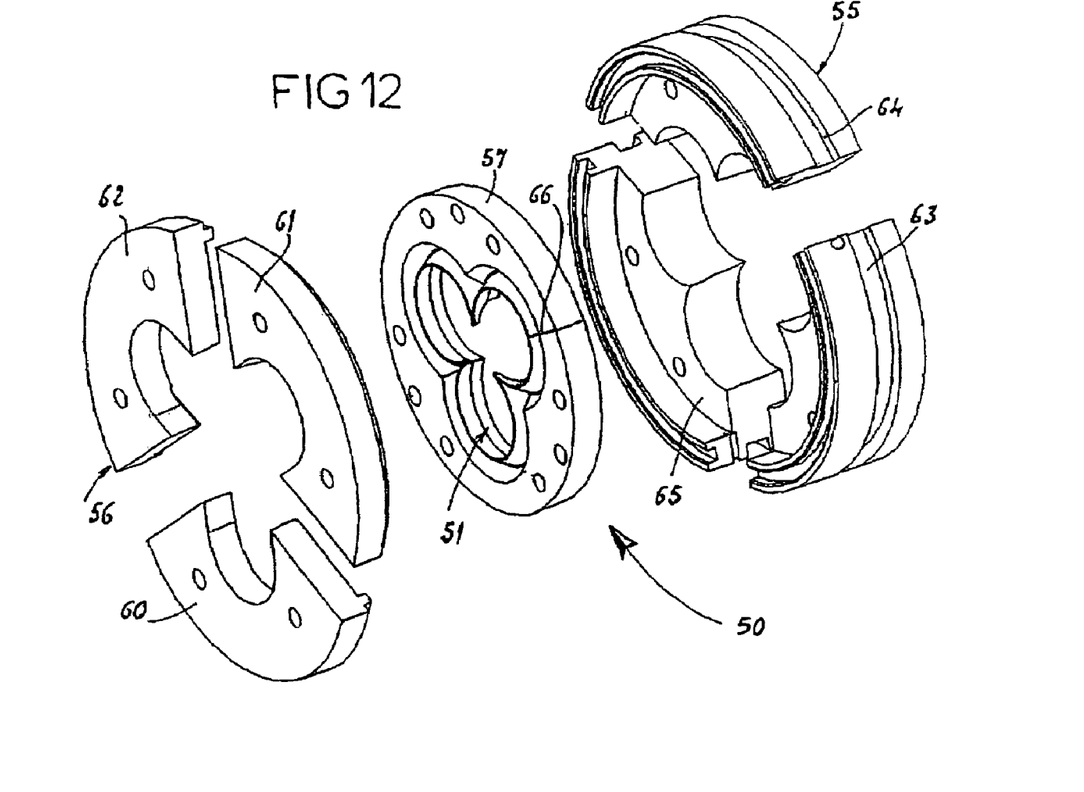

The intake member 22 for the fluid, such as water, is more particularly shown in FIGS. 10 to 12. This member comprises a fixed casing 40 and a rotating body 41, mounted so as to rotate inside the fixed casing.

The fixed casing 40 consists of two half-shells 43 and 44 that together define a hollow cylinder in which the rotating body 41 is housed so as to rotate. The body 41 itself adopts the shape of a cylindrical body through which the installation duct 1 passes in the longitudinal direction. This duct is, for example, an electrical cable 45 in the form of a twisted assembly consisting of the three branches or phases 46 to 48. As a variant, this cable could consist of two phases, which also form a twisted assembly.

The fluid is injected into the fixed casing 40 via an inlet orifice (not shown). To prevent the carrying fluid from leaking outwards from the fixed casing 40, outside the device, the rotating body 41 includes a sealing member 50 immobilized transversely to the direction of the cable 45, forming a sealing partition.

This sealing member 50 is of annular shape and has a window 51 through which the cable 45 passes. The shape of this window is complementary to the external outline of the twisted cable. When the cable consists of three branches, the window possesses three lobes 52 to 54, through each of which one of the branches 46 to 48 passes.

The sealing member 50 is formed from two rigid flanges 55 and 56 and a seal 57, which is sandwiched between these two flanges. The flanges and the seal lie in a plane approximately transversal to the direction of the cable. The seal 57 is applied in a sealed fashion to the twisted cable and is made of rubber or else of any known material for a dynamic seal, whereas the two flanges 55 and 56 are made of an aluminum alloy.

Each of the flanges consists respectively of three parts 60 to 62 and 63 to 65 in order to make it easier for them to fit around the cable 45. The seal 57 is provided with a slit 66 making it possible, by deforming, for it to be introduced onto the cable.

The rotating body 41 is also provided with two series of wheels 67 and 68, each placed at the inlet and at the outlet of the body (relative to the direction of travel of F of the cable). Each wheel is applied against one of the branches 46 to 48 of the cable in order to maintain the angle of the pitch of the helix defined by the twist of the cable.

The sealing member 50 is rotated by the cable 45 when the latter moves along the direction of the arrow F. The rotating body 41, integral with this member, is also rotated so that the sealing is obtained in a simple manner.

Figure 8:
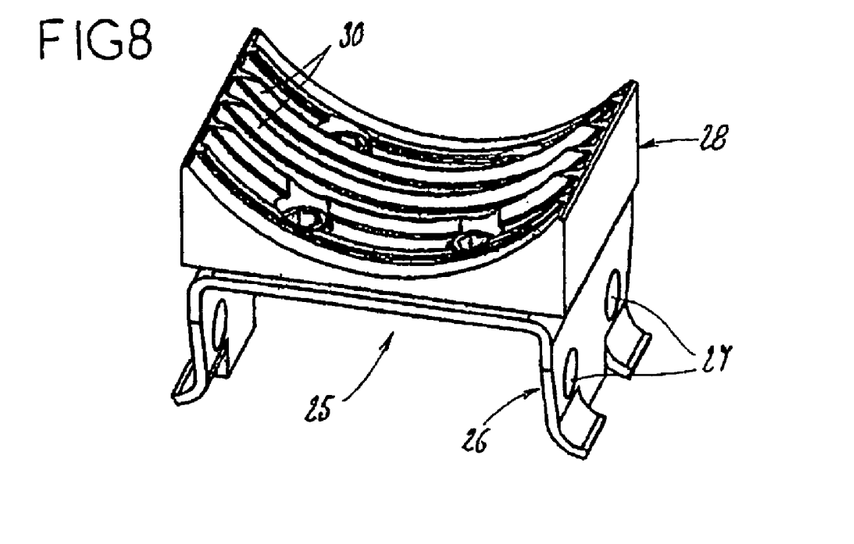
FIGS. 8 and 9 are perspective and top views, respectively, of a link of a chain of the pushing means in FIG. 7.
Figure 9:
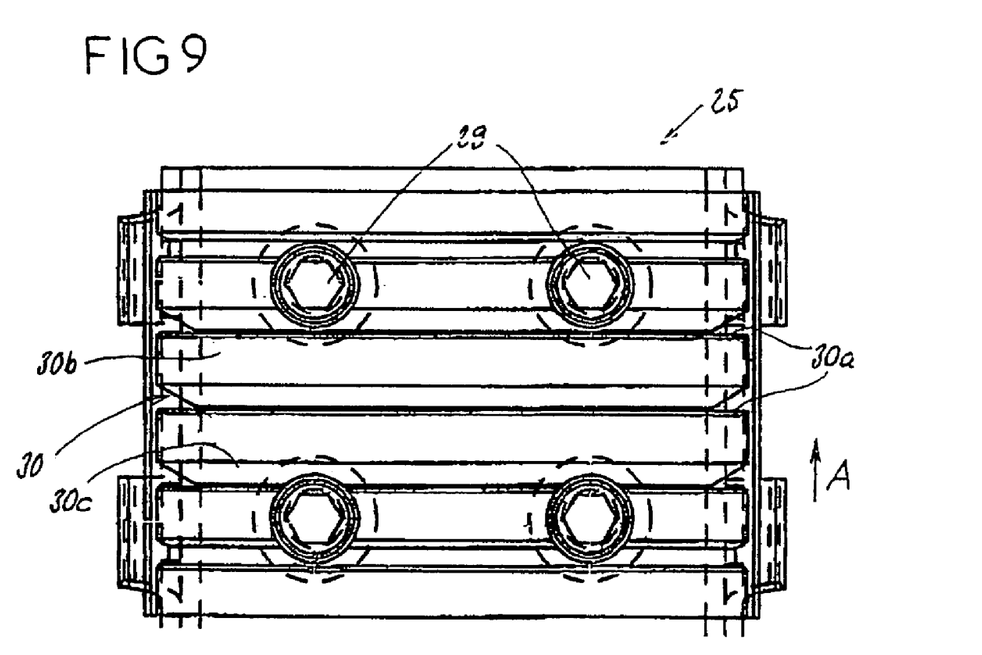

The chain 20 consists of an assembly of links 25 shown in FIGS. 8 and 9. Each link 25 is made up of a steel part 26 designed to link said links 25 together. Drillholes 26 and/or other means known as such are provided for linking said links 25 together. Each link 25 also has an upper part 28, for example made of aluminum, fitted onto the steel part 26 by means of bolts 29. The upper part 28 has, on the outside, i.e. on the side for purchase on the electrical cable 2, approximately transverse ribs 30. These ribs, obtained for example by molding, have a height of about 1 to 2 mm and have purchase on the external sheath of the electrical cable 2. The ribs 30 in the direction of circulation of the chain 20 have a particular shape, namely a substantially abrupt front face 30a, a substantially flat top 30b and a rear face 30c with a slope that is comparatively gentle compared with its front face 30a. The direction of circulation of the chains 20, and consequently of the ribs 30, is indicated by the arrow A in FIG. 9. It is therefore the substantially sloped front parts 30c that bite onto the external sheath of the electrical cable 2.

Such a conformation, and likewise the relatively small size of said ribs 30, prevents harmful damage to the sheath of the electrical cables 2. Advantageously, the ribs 30 have, in cross section of the upper part 28, a semicylindrical profile, the diameter of which is matched to the outside diameter of the electrical cables 2. Said cables are thus optimally gripped over a larger surface area and the risk of slippage is substantially reduced. To install an assembly of electrical cables 2 of triangular or twisted shape in an installation duct 1, the pushing device has not two drive belts, but three, arranged at 120°, each belt using flat and not semicylindrical drive teeth.

When high- or medium-power electrical cables 2 are engaged in the installation ducts 1, in accordance with the invention, said electrical cables 2 have a tendency, owing to their relatively high weight per unit length, to lie in the lowermost part of the installation duct 1 and rub against the latter. The free volume available for circulation of the water 6a, i.e. the fluid, is thus greater above the electrical cable 2 than below. There is consequently a velocity and pressure differential between the free space located respectively above and below the electrical cable 2. The latter consequently rubs against the lower wall of the installation duct 1 as soon as the relative density of said cable is greater than 1, which is always the case for medium- and high-power electrical cables. This results in rubbing between the external sheath of said electrical cable 2 and the installation duct 1, which may damage the external sheath of the cable 2. The pressure differential that is obtained in the duct 1 between the upper free space and the lower free space surrounding the electrical cable 2 causes centering of said electrical cable 2, which allows the water 6a to flow under said cable 2, at least intermittently. The flow of water in this relatively narrow lower free space makes it possible to cool the parts that are in rubbing contact, this having the consequence of substantially reducing the friction coefficient.

Specifically, it has been observed that when the temperature goes from 20° C. to 40° C. in the regions of frictional contact, the friction coefficient increases by 20%. The flow of water 6a as fluid thus also allows the temperature of the contacting parts of the electrical cable 2 and of the installation duct 1 to be maintained below certain values. This thus avoids an increase in the friction coefficient. It is beneficial, within the context of the method according to the invention, to provide means for cooling the liquid, in this case the water 6a, and, if required, means for controlling its temperature in order to control said cooling means.

The particular means for measuring the temperature and the location of the measurement points may also be envisioned specially at the end of the laying length or midway along the installation path when a chamber for access to the network is present.

The method according to the invention has the advantage that it makes it possible to maintain a rate of installation (rate of advance of the cable 2 into the duct 1) that is relatively constant, thanks to the control of the friction coefficient by means of a temperature measurement. The flow of the water 6a also makes it possible to remove the electrostatic charges that appear in the duct 1 during installation of the electrical cable 2.

The invention claimed is:

1. A pushing and non-floating method for installing a non-floating electrical cable along an uninterrupted installation section equal to or above one kilometer in length, the cable comprising at least one single-phase element having a conducting inner core and an insulating outer sheath, supporting an electrical voltage of at least 1000 V, the cable having a linear weight of at least 0.5 kg/m, and a relative density with respect to water greater than 1, the method comprising:
   providing along the installation section at least one installation duct, the ratio of the inside diameter of the duct to the outside diameter of the cable being between 1.2 and 1.6;
   pushing the cable into one inlet end of the at least one installation duct, with at least one the-main driving member engaging the outer sheath of the cable;
   injecting a pressurized liquid comprising water into the inlet end of the at least one installation duct, and providing at the inlet end a seal with respect to the injected liquid between an outer face of the cable being pushed and an inner face of the at least one installation duct, the at least one installation duct being fixed in relation to the cable; and
   adjusting injection of the flowing liquid in relation to a pushing thrust on the cable, so that, at least intermittently, the cable is centered into the at least one installation duct, and the pressurized liquid transfers thermal energy resulting from friction between the cable and the at least one installation duct.

2. The method as claimed in claim 1, wherein, the at least one installation duct comprises three tubes joined together in an external sheath and the electrical cable is a three-phase electrical cable that comprises three single-phase cables placed in the respective three tubes.

3. The method as claimed in claim 1, wherein the electrical cable is a twisted cable.

4. The method as claimed in claim 1, wherein, for laying the installation duct, a trench is dug, materials coming from the trench are removed, the at least one installation duct is laid in the trench and the trench is back-filled.

5. The method according to claim 1, wherein the cable has a linear weight of 8 to 35 kg/m.

6. The method according to claim 1, wherein the temperature of the injected liquid is adjusted in relation to a friction coefficient between the cable being pushed and the at least one installation duct, the at least one installation duct being fixed in relation to the cable.

7. The method according to claim 6, wherein the temperature of the injected liquid is adjusted so that its temperature ranges from 20 C to 40 C in regions of frictional contact between the cable and the at least one installation duct.

8. The method according to claim 6, wherein the liquid is cooled before its injection into the at least one installation duct.

9. The method according to claim 6, wherein the friction coefficient between the cable being pushed and the at least one installation duct, is detected by measuring the temperature of the injected liquid along its path within the installation duct.

10. An apparatus for installing a non-floatable electric cable into at least one installation duct by pushing the cable without floating the cable, the cable comprising at least one single-phase element having a conducting inner core and an insulating outer sheath, the apparatus comprising:
    pushing means for pushing the cable into an inlet of the at least one installation duct, the pushing means comprising a pushing unit having at least two opposed pushing members externally engaging the outer sheath of the cable, each of the pushing members comprising a belt, the belts arranged for exerting a clamping force on the cable, and having transverse ribs with respect to a circulation direction of the belt for gripping the cable, wherein each belt comprises an assembly of links, an external profile of which includes at least one of the transverse ribs;
    injecting means for injecting a pressurized liquid comprising water into the inlet of the at least one installation duct;
    sealing means at the inlet of the at least one duct, the sealing means sealing the injected liquid between an outer face of the cable being pushed and an inner face of the at least one installation duct, the at least one installation duct being fixed in relation to the cable; and
    control means for adjusting the injection of the flowing liquid in relation to a pushing thrust on the cable, so that, at least intermittently, the cable is centered into the at least one installation duct, and the pressurized liquid transfers thermal energy resulting from friction between the cable and the at least one installation duct.

11. An apparatus according to claim 10, wherein the pushing means comprise at least two pushing units disposed in series.

12. The apparatus as claimed in claim 10, wherein the transverse ribs have an approximately semicylindrical shape so as to increase their area of contact with the electrical cable.

13. The apparatus as claimed in claim 10, wherein the transverse ribs have, in the direction of advance of the chain, a profile whose cross section comprises, respectively, a sloped rear face, a flat top and a steep front face.

14. The apparatus as claimed in claim 10, wherein the pushing means is capable of driving a cable of circular cross section or an assembly of three twisted cables.

15. The apparatus according to claim 10, wherein the installed cable is a twisted cable, the sealing means being designed so that the cable passes through the sealing means and so as to constitute a partition impermeable to the fluid, and being rotated by the cable during the travel of the cable.

16. The apparatus as claimed in claim 15, wherein the sealing member includes a seal having a window provided with at least two lobes complementary in shape to an external outline of the twisted cable.

* * * * *